H. M. KEITH.
PLOW.
No. 108,488. Patented Oct. 18, 1870.
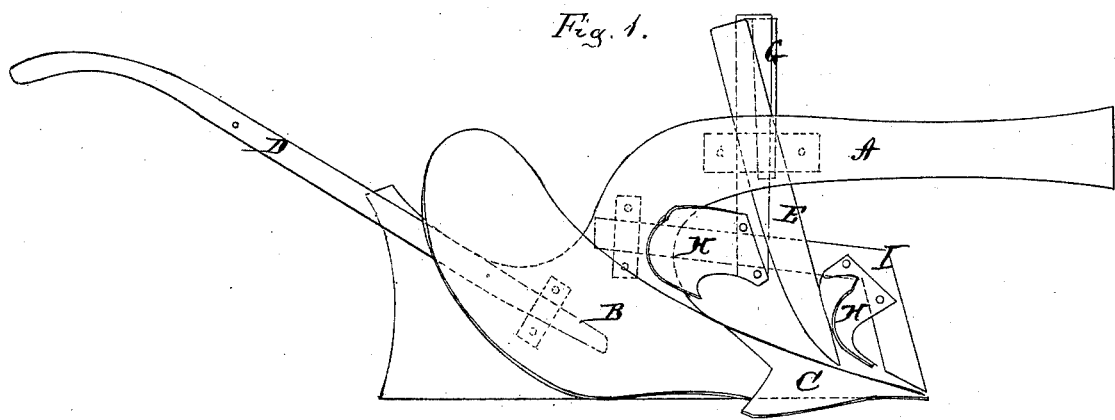
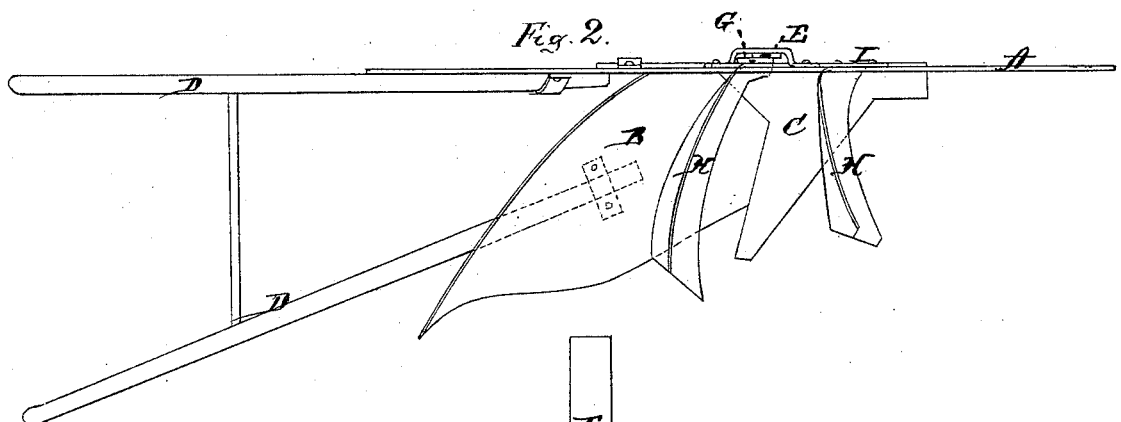
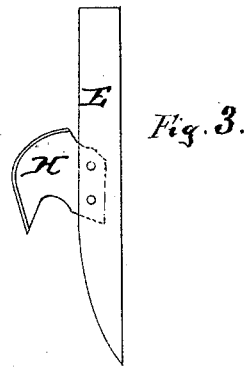
Witnesses:
Chas Jacobs
JV White
Inventor:
Horace M. Keith
Per
J V Alexander
Atty.

UNITED STATES PATENT OFFICE.

HORACE M. KEITH, OF COMMERCE, MICHIGAN.

IMPROVEMENT IN PLOWS.

Specification forming part of Letters Patent No. 108,488, dated October 18, 1870.

*To all whom it may concern:*

Be it known that I, HORACE M. KEITH, of Commerce, in the county of Oakland and State of Michigan, have invented certain new and useful Improvements in Plows; and I do hereby declare that the following is a full, clear, and exact description thereof, reference being had to the accompanying drawings, and to the letters of reference marked thereon, which form a part of this specification.

The nature of my invention consists in the construction and attachment to a plow-colter of an "edger," for cutting off the furrow-slice and depositing the same, grass downward, in the furrow formed by the plow.

In order to enable others skilled in the art to which my invention appertains to make and use the same, I will now proceed to describe the construction and operation, referring to the annexed drawings, in which—

Figure 1 is a side elevation, and Fig. 2 a plan view, of a plow with my improvement attached. Fig. 3 is a side view of a straight colter having the edger attached.

A represents the beam of a plow; B, the mold-board; C, the share or point, and D D the handles.

I represents a bent colter, the rear end of which is secured to the plow-beam, and the front end either held a short distance above or resting upon the point C. Across the angle of this colter is secured the edger H, which extends over the share or the mold-board. The lower front edge is concave from the ends inward, as shown, and its upper edge is curved forward. The colter cuts the furrow-sod away from the main sod, and as it is being raised on the plow the edger cuts it entirely loose, turns it over, and deposits it in the furrow. The grass being entirely covered up and separated causes the sod soon to rot, improving the soil.

The edger H may be attached to a straight colter, E, as shown in Fig. 3, or it may be attached to an independent bar, G, held on the plow-beam by the same means as the straight colter; but in all cases the edger should be so arranged as to be in rear of the cutting-edge of the colter. The advancage gained by using the edger with the bent colter is that the colter and edger may be longitudinally adapted without changing the angle of the cutting-edge of the colter and edger, which cannot be effected with the vertical adjustment.

Having thus fully described my invention, what I claim as new, and desire to secure by Letters Patent, is—

The edger N and colter I, constructed as described, and arranged upon the side of the plow-beam A, or plow-standard, to be longitudinally adjustable, substantially as and for the purpose set forth.

In testimony that I claim the foregoing as my own I affix my signature in presence of two witnesses.

HORACE M. KEITH.

Witnesses:
A. W. BURTT,
C. M. BEARDSLEY.